(12) United States Patent
Annaiah et al.

(10) Patent No.: US 10,993,110 B2
(45) Date of Patent: Apr. 27, 2021

(54) CONNECTIONLESS FAST METHOD FOR CONFIGURING WI-FI ON DISPLAYLESS WI-FI IOT DEVICE

(71) Applicant: NVIDIA Corp., Santa Clara, CA (US)

(72) Inventors: Nagaraj Annaiah, San Jose, CA (US); Om Prakash Singh, Telangana (IN)

(73) Assignee: NVIDIA Corp., Santa Clara, CA (US)

( * ) Notice: Subject to any disclaimer, the term of this patent is extended or adjusted under 35 U.S.C. 154(b) by 200 days.

(21) Appl. No.: 16/034,635

(22) Filed: Jul. 13, 2018

(65) Prior Publication Data

US 2020/0021983 A1 Jan. 16, 2020

(51) Int. Cl.
| | |
|---|---|
| *H04W 12/06* | (2021.01) |
| *H04L 29/12* | (2006.01) |
| *H04L 29/08* | (2006.01) |
| *H04W 88/08* | (2009.01) |
| *H04W 84/12* | (2009.01) |
| *H04W 80/12* | (2009.01) |

(52) U.S. Cl.
CPC ......... *H04W 12/06* (2013.01); *H04L 61/6022* (2013.01); *H04L 67/12* (2013.01); *H04W 80/12* (2013.01); *H04W 84/12* (2013.01); *H04W 88/08* (2013.01)

(58) Field of Classification Search
None
See application file for complete search history.

(56) References Cited

U.S. PATENT DOCUMENTS

| 6,965,591 B1 * | 11/2005 | Roy ..................... H04L 12/6418 370/352 |
| 7,653,011 B2 * | 1/2010 | Rahman .................. H04L 45/02 370/256 |
| 7,940,732 B2 * | 5/2011 | Lowry .................. H04L 67/125 370/338 |
| 8,126,145 B1 * | 2/2012 | Tewari .................. H04L 9/0841 380/255 |
| 8,224,256 B2 * | 7/2012 | Citrano, III ........ G05B 19/4185 455/67.11 |
| 8,359,372 B2 * | 1/2013 | Yalovsky .............. G06F 13/387 709/220 |
| 8,370,918 B1 * | 2/2013 | Doukhvalov ........... H04L 63/02 726/12 |
| 8,537,716 B2 * | 9/2013 | Gudipudi .............. H04W 16/00 370/254 |
| 8,644,272 B2 * | 2/2014 | Sewall ................ H04L 41/0806 370/338 |

(Continued)

OTHER PUBLICATIONS

IEEE 802.11 Standard (Year: 2016).*

(Continued)

*Primary Examiner* — Esther B. Henderson
(74) *Attorney, Agent, or Firm* — Rowan TELS LLC

(57) ABSTRACT

A method involves a headless IoT device wirelessly communicating a MAC address to a client device in response to a scan by the client device, and receiving from the client device a vendor action frame comprising access credentials for communicating via a Wi-Fi access point. The IoT device applies the credentials to authenticate to the Wi-Fi access point, forms an application layer for communicating over the Wi-Fi access point network, and communicates with the client device via the application layer.

13 Claims, 7 Drawing Sheets

(56) References Cited

U.S. PATENT DOCUMENTS

| | | | | |
|---|---|---|---|---|
| 8,681,691 B2* | 3/2014 | Shen | H04W 88/08 | 370/328 |
| 8,719,571 B2* | 5/2014 | Clay | H04L 9/3273 | 713/165 |
| 8,745,396 B2* | 6/2014 | Hui | H04N 21/8549 | 713/175 |
| 8,763,075 B2* | 6/2014 | Guevin | H04L 63/10 | 726/1 |
| 8,766,794 B2* | 7/2014 | Ferguson | G06Q 10/06315 | 340/539.13 |
| 8,792,636 B2* | 7/2014 | Tu | H04W 12/001 | 380/44 |
| 8,844,012 B1* | 9/2014 | Chan | H04W 12/06 | 709/225 |
| 8,862,096 B1* | 10/2014 | Viswanathan | H04W 12/06 | 455/410 |
| 8,870,084 B2* | 10/2014 | Hamman | H04L 9/0866 | 235/380 |
| 8,918,847 B2* | 12/2014 | Gilbert | H04W 12/0609 | 726/5 |
| 8,966,601 B2* | 2/2015 | Green | H04L 9/0827 | 726/7 |
| 8,995,923 B2* | 3/2015 | Jabara | H04L 12/5692 | 455/67.11 |
| 9,003,488 B2* | 4/2015 | Spencer | H04W 8/22 | 726/3 |
| 9,021,081 B2* | 4/2015 | Sewall | H04L 12/287 | 709/224 |
| 9,094,280 B2* | 7/2015 | Wood | H04L 43/045 | |
| 9,143,402 B2* | 9/2015 | Tinnakornsrisuphap | H04L 41/0809 | |
| 9,210,581 B2* | 12/2015 | Toepke | G05B 19/4185 | |
| 9,232,461 B2* | 1/2016 | Sewall | H04L 12/2856 | |
| 9,237,102 B2* | 1/2016 | Sewall | H04L 45/04 | |
| 9,258,765 B1* | 2/2016 | daCosta | H04W 40/24 | |
| 9,294,353 B2* | 3/2016 | Sewall | H04W 8/26 | |
| 9,301,141 B1* | 3/2016 | Mincher | H04W 4/70 | |
| 9,378,467 B1* | 6/2016 | Chaiyochlarb | G06F 3/04817 | |
| 9,386,666 B2* | 7/2016 | Economy | H04W 76/10 | |
| 9,445,440 B2* | 9/2016 | Huang | H04W 76/10 | |
| 9,465,511 B1* | 10/2016 | Cline | G06F 3/04847 | |
| 9,491,621 B2* | 11/2016 | Cherian | H04W 12/06 | |
| 9,521,614 B2* | 12/2016 | Estevez | H04W 52/0206 | |
| 9,525,566 B2* | 12/2016 | Johnston-Watt | H04L 41/0663 | |
| 9,584,406 B2* | 2/2017 | Sewall | H04L 45/12 | |
| 9,602,279 B1* | 3/2017 | Tran | H04L 9/14 | |
| 9,609,513 B2* | 3/2017 | Jabara | H04W 12/06 | |
| 9,609,588 B2* | 3/2017 | Tonouchi | H04W 48/20 | |
| 9,674,037 B2* | 6/2017 | Gorajala Chandra | H04L 41/0803 | |
| 9,684,296 B2* | 6/2017 | Russell, III | G05B 19/0428 | |
| 9,729,620 B1* | 8/2017 | Shavell | H04L 67/10 | |
| 9,749,844 B1* | 8/2017 | Sovani | H04W 8/005 | |
| 9,819,901 B1* | 11/2017 | Zhu | H04W 52/46 | |
| 9,871,656 B2* | 1/2018 | Yao | H04W 12/04 | |
| 9,888,378 B2* | 2/2018 | Anderson | H04W 12/06 | |
| 9,900,919 B1* | 2/2018 | Butler | H04W 8/005 | |
| 9,936,479 B2* | 4/2018 | Patil | H04W 52/0216 | |
| 9,973,485 B2* | 5/2018 | Keidar | G06F 21/6218 | |
| 9,998,334 B1* | 6/2018 | Yu | H04L 63/10 | |
| 10,013,181 B2* | 7/2018 | Borlick | G06F 3/0683 | |
| 10,050,444 B2* | 8/2018 | Neyhart | H04L 12/2807 | |
| 10,070,289 B1* | 9/2018 | Inamdar | H04W 48/16 | |
| 10,122,832 B2* | 11/2018 | Borlick | H04L 69/08 | |
| 10,129,748 B2* | 11/2018 | Teng | H04W 12/06 | |
| 10,135,629 B2* | 11/2018 | Browne, Jr. | H04L 67/12 | |
| 10,148,495 B1* | 12/2018 | Oczkowski | H04W 12/06 | |
| 10,171,484 B2* | 1/2019 | Balasubramanian | H04L 63/1441 | |
| 10,171,585 B2* | 1/2019 | Borlick | H04L 67/1097 | |
| 10,177,985 B2* | 1/2019 | Mandle | H04L 43/08 | |
| 10,206,085 B2* | 2/2019 | Cho | H04L 41/0846 | |
| 10,218,522 B2* | 2/2019 | Qiu | H04L 12/18 | |
| 10,244,086 B2* | 3/2019 | Newman, Jr. | H04L 69/18 | |
| 10,285,040 B2* | 5/2019 | Liu | H04W 4/80 | |
| 10,292,047 B1* | 5/2019 | Jiang | H04W 48/16 | |
| 10,333,675 B2* | 6/2019 | Meylan | H04L 5/0092 | |
| 10,382,435 B2* | 8/2019 | Li | H04L 63/0414 | |
| 10,404,559 B2* | 9/2019 | Weiss | H04L 43/0817 | |
| 10,581,523 B2* | 3/2020 | Barritt | H04B 10/1129 | |
| 10,587,147 B2* | 3/2020 | Carmen, Jr. | H02J 7/025 | |
| 10,587,340 B2* | 3/2020 | Barritt | H04B 10/118 | |
| 10,588,204 B2* | 3/2020 | Pessina | H05B 47/19 | |
| 10,592,534 B2* | 3/2020 | Gong | G06F 16/288 | |
| 2004/0255112 A1* | 12/2004 | Choi | H04L 63/123 | 713/155 |
| 2005/0198233 A1* | 9/2005 | Manchester | H04L 41/0213 | 709/221 |
| 2006/0187891 A1* | 8/2006 | Sairanen | H04L 67/04 | 370/338 |
| 2007/0171859 A1* | 7/2007 | Brahmbhatt | H04L 63/0492 | 370/328 |
| 2008/0310444 A1* | 12/2008 | Dekel | H04L 12/1877 | 370/432 |
| 2009/0033485 A1* | 2/2009 | Naeve | H04W 8/005 | 340/539.23 |
| 2009/0129347 A1* | 5/2009 | Woo | H04L 41/0806 | 370/338 |
| 2011/0151840 A1* | 6/2011 | Gong | G06Q 30/0267 | 455/414.1 |
| 2011/0185183 A1* | 7/2011 | Yamamoto | G06F 21/33 | 713/182 |
| 2013/0059541 A1* | 3/2013 | Sloan | G06Q 50/24 | 455/41.2 |
| 2013/0170432 A1* | 7/2013 | O'Brien | H04W 4/06 | 370/328 |
| 2013/0198274 A1* | 8/2013 | Papakipos | H04L 51/32 | 709/204 |
| 2013/0203413 A1* | 8/2013 | Lambert | H04W 8/005 | 455/435.1 |
| 2013/0217359 A1* | 8/2013 | Cherian | H04W 4/70 | 455/411 |
| 2013/0229995 A1* | 9/2013 | Cai | H04W 74/0875 | 370/329 |
| 2013/0286889 A1* | 10/2013 | Cherian | H04L 63/18 | 370/254 |
| 2014/0071925 A1* | 3/2014 | Liu | H04W 28/08 | 370/329 |
| 2014/0082206 A1* | 3/2014 | Samuell | H04L 65/1069 | 709/227 |
| 2014/0086211 A1* | 3/2014 | Liu | H04L 45/38 | 370/331 |
| 2014/0211705 A1* | 7/2014 | Baek | H04W 76/023 | 370/329 |
| 2014/0254502 A1* | 9/2014 | Cai | H04W 48/20 | 370/329 |
| 2014/0293978 A1* | 10/2014 | Yang | H04W 8/005 | 370/338 |
| 2014/0302842 A1* | 10/2014 | Lloyd | H04L 41/0806 | 455/426.1 |
| 2014/0325049 A1* | 10/2014 | Goto | H04L 67/16 | 709/223 |
| 2014/0328334 A1* | 11/2014 | Viswanathan | H04W 12/06 | 370/338 |
| 2014/0355579 A1* | 12/2014 | Viswanathan | H04W 4/50 | 370/338 |
| 2015/0023183 A1* | 1/2015 | Ilsar | H04W 48/16 | 370/244 |
| 2015/0023336 A1* | 1/2015 | Ilsar | H04W 48/20 | 370/338 |
| 2015/0026317 A1* | 1/2015 | Ilsar | H04L 41/0816 | 709/221 |
| 2015/0026779 A1* | 1/2015 | Ilsar | H04W 12/06 | 726/5 |
| 2015/0052231 A1* | 2/2015 | Sun | H04L 41/0803 | 709/223 |
| 2015/0071052 A1* | 3/2015 | Hershberg | H04W 24/04 | 370/216 |

(56) References Cited

U.S. PATENT DOCUMENTS

| | | | |
|---|---|---|---|
| 2015/0071216 A1* | 3/2015 | Ilsar | H04W 48/12 370/329 |
| 2015/0113277 A1* | 4/2015 | Harkins | H04L 9/083 713/171 |
| 2015/0130957 A1* | 5/2015 | Berelejis | H04L 67/12 348/211.1 |
| 2015/0146706 A1* | 5/2015 | Goluboff | H04W 76/10 370/338 |
| 2015/0172902 A1* | 6/2015 | Kasslin | H04L 45/745 370/328 |
| 2015/0200811 A1* | 7/2015 | Kasslin | H04L 41/12 370/254 |
| 2015/0215406 A1* | 7/2015 | Eggert | H04L 67/147 709/228 |
| 2015/0229475 A1* | 8/2015 | Benoit | G06F 21/41 713/168 |
| 2015/0268670 A1* | 9/2015 | Nies | A01G 25/16 700/282 |
| 2015/0295781 A1* | 10/2015 | Maes | G06F 9/5072 715/735 |
| 2015/0296377 A1* | 10/2015 | Sheu | H04L 63/0869 380/279 |
| 2015/0319029 A1* | 11/2015 | Abraham | H04W 76/14 370/310 |
| 2015/0326727 A1* | 11/2015 | Desai | H04M 3/53333 455/412.2 |
| 2015/0365835 A1* | 12/2015 | Segev | H04W 8/005 370/252 |
| 2015/0373183 A1* | 12/2015 | Woolsey | H04W 4/12 348/14.08 |
| 2015/0382198 A1* | 12/2015 | Kashef | H04L 63/08 726/5 |
| 2016/0007396 A1* | 1/2016 | Goto | H04L 67/16 370/338 |
| 2016/0014207 A1* | 1/2016 | Busch | H04W 76/14 455/420 |
| 2016/0014591 A1* | 1/2016 | Sekaran | H04M 7/1285 455/432.1 |
| 2016/0014689 A1* | 1/2016 | Malinen | H04W 48/20 455/434 |
| 2016/0037436 A1* | 2/2016 | Spencer | H04W 48/12 370/338 |
| 2016/0050165 A1* | 2/2016 | Thomas | G06F 3/04855 715/752 |
| 2016/0072737 A1* | 3/2016 | Forster | H04L 51/02 709/206 |
| 2016/0072861 A1* | 3/2016 | Woolsey | H04W 4/14 455/414.1 |
| 2016/0073223 A1* | 3/2016 | Woolsey | G01C 21/3438 455/457 |
| 2016/0077674 A1* | 3/2016 | Forster | G06F 3/0481 715/753 |
| 2016/0080889 A1* | 3/2016 | Viswanathan | H04W 12/003 455/419 |
| 2016/0087957 A1* | 3/2016 | Shah | H04L 63/205 726/1 |
| 2016/0105424 A1* | 4/2016 | Logue | H04L 63/0823 726/7 |
| 2016/0112941 A1* | 4/2016 | Desai | H04L 12/145 370/329 |
| 2016/0128113 A1* | 5/2016 | Qi | H04W 8/005 370/329 |
| 2016/0135241 A1* | 5/2016 | Gujral | H04W 4/70 370/328 |
| 2016/0150009 A1* | 5/2016 | LeRoy | H04L 67/1095 709/206 |
| 2016/0164810 A1* | 6/2016 | Wolz | H04L 51/046 709/206 |
| 2016/0165038 A1* | 6/2016 | Lim | H04M 1/72566 715/728 |
| 2016/0171980 A1* | 6/2016 | Liddell | G10L 15/22 704/275 |
| 2016/0192191 A1* | 6/2016 | Lee | H04W 12/06 726/7 |
| 2016/0198494 A1* | 7/2016 | Huang | H04W 74/0833 370/329 |
| 2016/0234160 A1* | 8/2016 | Bhupati | H04L 61/1594 |
| 2016/0234678 A1* | 8/2016 | Baum | H04W 12/003 |
| 2016/0239609 A1* | 8/2016 | Vuong | A61B 5/4821 |
| 2016/0242033 A1* | 8/2016 | Jung | H04W 12/0609 |
| 2016/0242056 A1* | 8/2016 | Patil | H04W 76/14 |
| 2016/0270020 A1* | 9/2016 | Adrangi | H04L 67/02 |
| 2016/0270137 A1* | 9/2016 | Yong | H04W 76/14 |
| 2016/0278112 A1* | 9/2016 | Liu | H04W 8/005 |
| 2016/0285630 A1* | 9/2016 | Abraham | H04L 9/0861 |
| 2016/0286395 A1* | 9/2016 | Adrangi | H04W 12/06 |
| 2016/0286476 A1* | 9/2016 | Patil | H04W 48/18 |
| 2016/0309472 A1* | 10/2016 | Yong | H04W 72/0446 |
| 2016/0309493 A1* | 10/2016 | Shmukler | H04W 48/16 |
| 2016/0323689 A1* | 11/2016 | Goluboff | H04W 12/06 |
| 2016/0323925 A1* | 11/2016 | Alanen | H04W 8/005 |
| 2016/0335138 A1* | 11/2016 | Surti | G06F 9/44526 |
| 2016/0337614 A1* | 11/2016 | Siminoff | H04L 12/2869 |
| 2016/0353269 A1* | 12/2016 | Kasslin | H04W 8/005 |
| 2016/0374133 A1* | 12/2016 | Logue | H04L 12/2809 |
| 2017/0013449 A1* | 1/2017 | Raman | G06F 16/951 |
| 2017/0034769 A1* | 2/2017 | Kim | H04W 48/08 |
| 2017/0048373 A1* | 2/2017 | Dees | H04L 12/2809 |
| 2017/0048378 A1* | 2/2017 | Rubinstein | H04M 1/72552 |
| 2017/0048785 A1* | 2/2017 | Ge | H04M 1/026 |
| 2017/0086223 A1* | 3/2017 | Chen | H04W 74/02 |
| 2017/0093625 A1* | 3/2017 | Pera | H04W 88/12 |
| 2017/0134182 A1* | 5/2017 | Davis | G01D 4/006 |
| 2017/0142765 A1* | 5/2017 | Jales | H04W 76/14 |
| 2017/0170934 A1* | 6/2017 | Jeyachandrasekar | H04W 8/005 |
| 2017/0171833 A1* | 6/2017 | Vamaraju | H04W 60/04 |
| 2017/0208531 A1* | 7/2017 | Huang | H04W 28/021 |
| 2017/0215070 A1* | 7/2017 | Sakai | H04W 12/08 |
| 2017/0230905 A1* | 8/2017 | Pularikkal | H04W 48/20 |
| 2017/0235812 A1* | 8/2017 | Gong | G06F 16/285 707/737 |
| 2017/0265238 A1* | 9/2017 | Li | G06F 21/44 |
| 2017/0280377 A1* | 9/2017 | Patil | H04L 45/122 |
| 2017/0289741 A1* | 10/2017 | Huang | H04W 48/12 |
| 2017/0303123 A1* | 10/2017 | Villar | H04L 9/0819 |
| 2017/0303245 A1* | 10/2017 | Asterjadhi | H04L 43/0894 |
| 2017/0311341 A1* | 10/2017 | Patil | H04L 12/18 |
| 2017/0325230 A1* | 11/2017 | Abraham | H04L 67/16 |
| 2017/0353981 A1* | 12/2017 | Lee | H04W 12/08 |
| 2017/0359338 A1* | 12/2017 | Tschofenig | G06F 21/34 |
| 2018/0007140 A1* | 1/2018 | Brickell | H04W 4/80 |
| 2018/0041507 A1* | 2/2018 | Sivarajan | H04W 12/0609 |
| 2018/0041830 A1* | 2/2018 | Shahamat | H04M 11/025 |
| 2018/0041897 A1* | 2/2018 | Prasad | H04W 4/50 |
| 2018/0063714 A1* | 3/2018 | Stephenson | H04W 12/04 |
| 2018/0069851 A1* | 3/2018 | Terao | G06F 16/381 |
| 2018/0092011 A1* | 3/2018 | Lin | H04L 12/2816 |
| 2018/0109418 A1* | 4/2018 | Cammarota | H04L 63/08 |
| 2018/0114435 A1* | 4/2018 | Singh | G06F 3/013 |
| 2018/0124670 A1* | 5/2018 | Alanen | H04L 63/0428 |
| 2018/0131421 A1* | 5/2018 | Chen | H04B 7/088 |
| 2018/0139088 A1* | 5/2018 | Lin | H04L 41/0803 |
| 2018/0176009 A1* | 6/2018 | Agerstam | H04W 76/11 |
| 2018/0191415 A1* | 7/2018 | Aryafar | H04B 7/0617 |
| 2018/0233136 A1* | 8/2018 | Torok | H04R 3/12 |
| 2018/0233137 A1* | 8/2018 | Torok | G10L 15/22 |
| 2018/0234765 A1* | 8/2018 | Torok | H04R 3/12 |
| 2018/0234902 A1* | 8/2018 | Talbert | H04W 36/14 |
| 2018/0288614 A1* | 10/2018 | Zaks | H04L 63/08 |
| 2018/0335514 A1* | 11/2018 | Dees | G01S 7/36 |
| 2018/0359633 A1* | 12/2018 | Liu | H04L 9/0861 |
| 2019/0007977 A1* | 1/2019 | Asterjadhi | H04W 74/006 |
| 2019/0014469 A1* | 1/2019 | Dees | H04L 63/162 |
| 2019/0042086 A1* | 2/2019 | White | G06Q 30/016 |
| 2019/0044737 A1* | 2/2019 | Singhi | H04L 63/0823 |
| 2019/0051305 A1* | 2/2019 | Liddell | G10L 15/26 |
| 2019/0052683 A1* | 2/2019 | Logue | F24F 11/62 |
| 2019/0089693 A1* | 3/2019 | Ding | H04L 63/0807 |
| 2019/0090175 A1* | 3/2019 | Mestanov | H04W 84/04 |
| 2019/0098483 A1* | 3/2019 | Qi | H04L 69/22 |

(56) References Cited

U.S. PATENT DOCUMENTS

| | | | |
|---|---|---|---|
| 2019/0116493 A1* | 4/2019 | Cyril | H04L 63/102 |
| 2019/0141572 A1* | 5/2019 | Zaks | H04L 9/3242 |
| 2019/0191371 A1* | 6/2019 | Alanen | H04W 52/0235 |
| 2019/0268906 A1* | 8/2019 | Perdomo | H04W 4/021 |
| 2019/0274208 A1* | 9/2019 | Zeira | H05B 47/105 |
| 2019/0288756 A1* | 9/2019 | Aryafar | H04W 72/046 |
| 2019/0289603 A1* | 9/2019 | Yong | H04W 76/14 |
| 2019/0289648 A1* | 9/2019 | Kim | H04W 76/11 |
| 2019/0320407 A1* | 10/2019 | Goyal | H04W 8/005 |
| 2019/0349709 A1* | 11/2019 | Kim | H04W 4/50 |
| 2019/0357214 A1* | 11/2019 | Kurian | H04W 76/10 |
| 2019/0372973 A1* | 12/2019 | Gaonkar | H04W 12/0609 |
| 2020/0008095 A1* | 1/2020 | Patil | H04W 12/001 |
| 2020/0015043 A1* | 1/2020 | Patil | H04W 48/08 |
| 2020/0059442 A1* | 2/2020 | Forster | H04L 51/02 |
| 2020/0092881 A1* | 3/2020 | Nezou | H04W 72/1257 |

OTHER PUBLICATIONS

Reiter, Gil. "A primer to Wi-Fi® provisioning for IoT applications," Jul. 2014, http://www.ti.com/lit/wp/swry011/swry011.pdf.

\* cited by examiner

US 10,993,110 B2

CONNECTIONLESS FAST METHOD FOR CONFIGURING WI-FI ON DISPLAYLESS WI-FI IOT DEVICE

BACKGROUND

Wi-Fi is a wireless communication technology that allows mobile devices such as cellphones and tablets to wirelessly connect to the Internet or other computer data networks. Many devices include a display and a keyboard for the user interface. A typical procedure for provisioning a Wi-Fi connection on such devices involves presenting on the display a list of available Wi-Fi networks to the user. After choosing the network, the user is prompted for a password. If the password is correct, the connection is successfully established.

The process of establishing a secure Wi-Fi connection becomes more challenging for certain Internet of Things (IoT) devices that do not include a display and a keyboard. These so-called "headless" devices require alternate methods to obtain the network name and password from the user.

One conventional method for establishing secure Wi-Fi connections for headless IoT devices utilizes the Software Access Point (Soft AP) process. Using Soft AP, a client device, such as a tablet, phone, etc., first executes a two-step process: 1) the client device disconnects from the Wi-Fi network to connect to the IoT device to share Wi-Fi credentials (SSID and Password), and 2) the client device connects back to the Wi-Fi network and waits for the target IoT device to connect to the Wi-Fi network.

In another conventional method, the un-provisioned IoT device wakes-up initially as a Wi-Fi access point, with an SSID defined by the equipment manufacturer. Before trying to connect to the external Wi-Fi network for the first time, the un-provisioned device creates a Wi-Fi network of its own, allowing a PC or a smart phone (for example) to connect to it directly to facilitate its initial configuration. Often the un-provisioned device executes an embedded web server. After the smartphone, PC, etc. connects to the un-provisioned device's Wi-Fi access point, it opens the smart phone's web browser and browses into the device's web site via a pre-defined local URL or IP address. In the embedded web site, the user chooses (or types in) the external Wi-Fi network name and password. The un-provisioned device stores the network credentials in nonvolatile memory and then switches modes in order to connect to the external Wi-Fi network using the stored network credentials.

SmartConfig™ technology is a proprietary provisioning method of Texas Instruments® that uses a mobile app to broadcast the network credentials from a client device to an unprovisioned headless Wi-Fi device. When triggered by a configuration signal from the client device the un-provisioned device enters a special scan mode, waiting to pick up the network information that is being broadcasted by the client device. The client device needs to be connected to the Wi-Fi network to be able to transmit the configuration signal to the un-provisioned device. The SSID that the client device is connected to is displayed automatically by an application on the client device. The user of the client device then adds the network password and activates a control on the client device to begin the process of provisioning the un-provisioned device on the external Wi-Fi network. After the network credentials are picked up by the unprovisioned device, it connects automatically to the external Wi-Fi network and sends out a service discovery message back to the client device. The application on the client device detects the service discovery message and presents a notification to the user that the previously un-provisioned device was provisioned on the external Wi-Fi network successfully.

These conventional methods are inefficient and utilize more steps than needed. A need therefore exists for method of establishing Wi-Fi connections for headless IoT devices that reduces the number of steps and avoids temporary disconnection of the Wi-Fi connection between the client device and the Wi-Fi network while configuring the IoT device.

BRIEF SUMMARY

Embodiments of a method are disclosed for connecting headless IoT devices to Wi-Fi networks utilizing a Wi-Fi action frame (Wi-Fi MAC layer packet) to send Wi-Fi credential to the IoT device. The action frame is sent in a manner that does not require association with the Wi-Fi access point.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Terminology used herein should be accorded its ordinary meaning in the relevant art unless otherwise indicated expressly or by context.

"Application layer" herein refers to logic implementing protocols for high level communication across a wireless network, e.g., an IP network implemented on 802.11 standard networks.

"802.11" herein refers to a set of media access control (MAC) and physical layer (PHY) specifications for implementing wireless local area network (WLAN) computer communication in the 900 MHz and 2.4, 3.6, 5, and 60 GHz frequency bands, for example.

Figure 1:
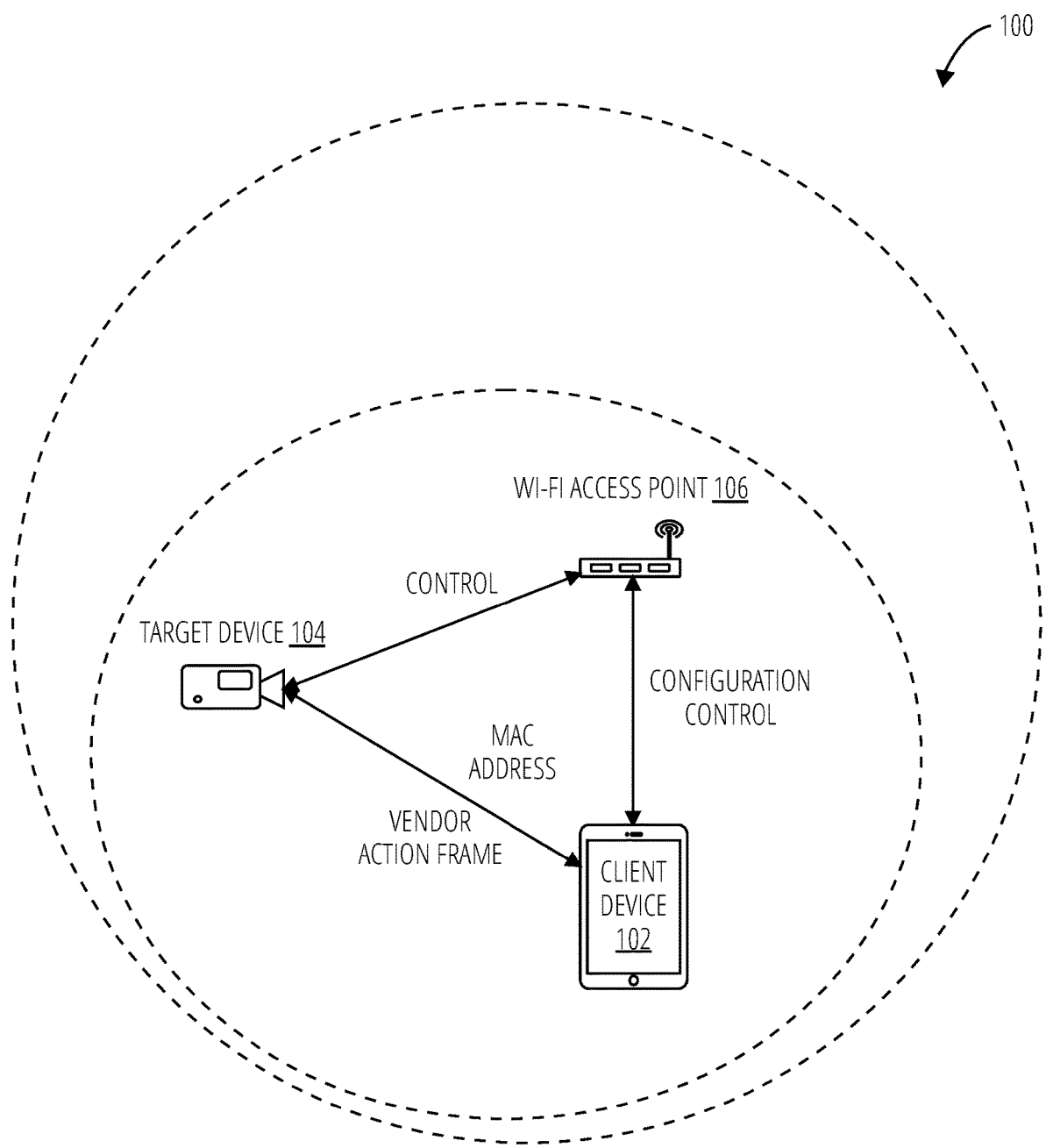
FIG. 1 illustrates an embodiment of an operating environment 100.

Referring to FIG. 1, an operating environment 100, in one embodiment, comprises a client device 102, a target device 104, and a Wi-Fi access point 106. The client device 102 scans for the target device 104. When the client device 102 detects the target device 104, the media access control (MAC) address is received from the target device 104. The client device 102 then sends a vendor action frame to the target device 104 with the credentials for the Wi-Fi access point 106. The client device 102 may also send instructions to the target device 104 to generate an application layer for communication over the Wi-Fi access point 106 and to further send a vendor action frame to the client device 102, if the application layer is not formed or the connection is not established.

The target device 104 may send a MAC address in response to detecting a scan by the client device 102. The target device 104 may in some cases broadcast the MAC address, e.g. as an 802.11 beacon. The target device 104 may, in response to receiving the vendor action frame with credentials for the Wi-Fi access point 106 from the client device 102, send a control (e.g., MAC 802.11 association and authentication control) to the Wi-Fi access point 106 to authenticate to and join the Wi-Fi network. If the target device 104 fails to join the Wi-Fi network, the target device 104 may send a vendor action frame to the client device 102 indicating the failure, and the interaction between the client device 102 and the target device 104 may be repeated one or more preconfigured times.

In response to the target device 104 successfully joining the Wi-Fi network, the target device 104 and client device 102 may cooperate to each form an application layer for communication over the Wi-Fi access point 106.

Figure 2:
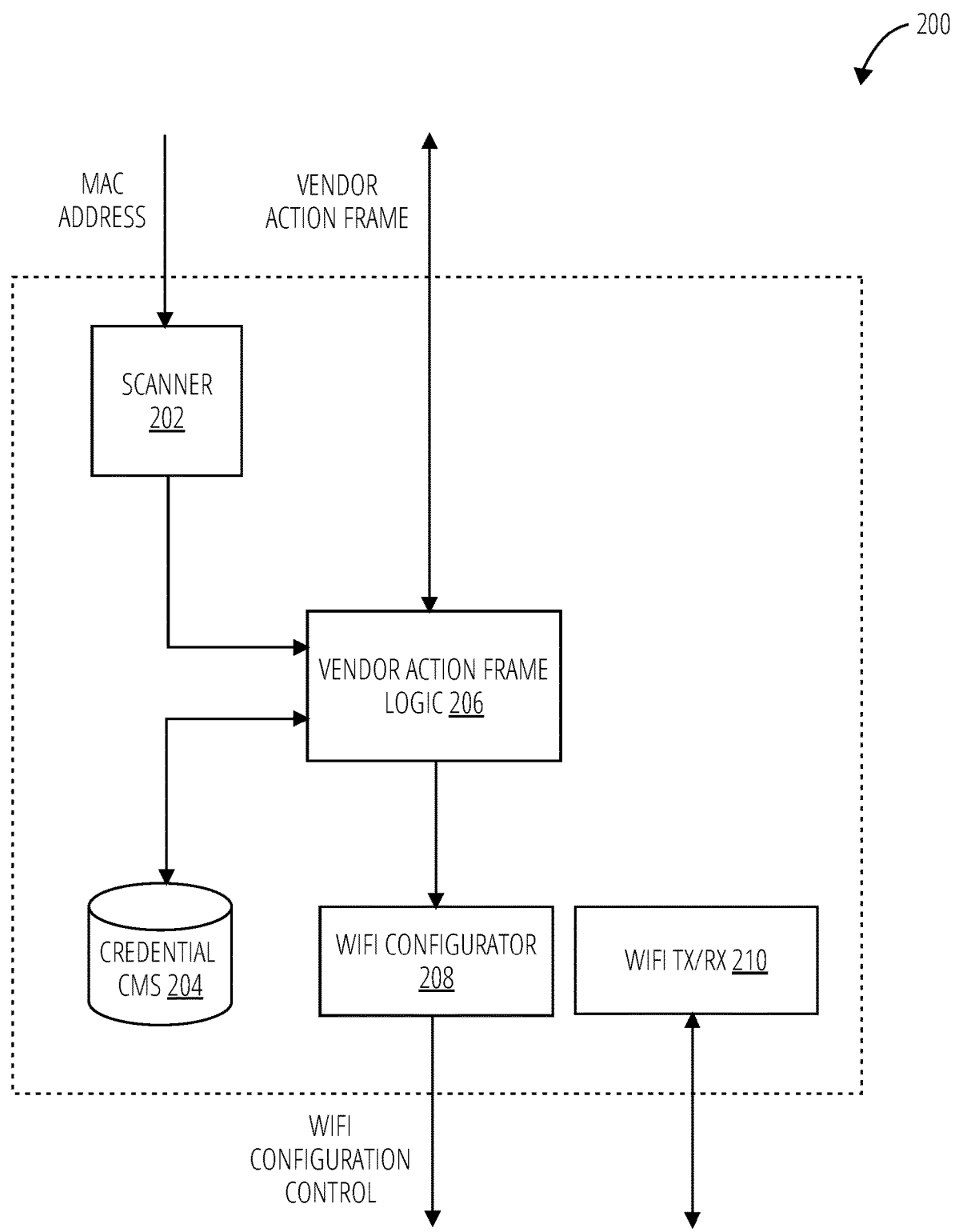
FIG. 2 illustrates an embodiment of a client device 200.

Referring to FIG. 2, a client device 200 in one embodiment comprises a scanner 202, a credential control memory structure 204, vendor action frame logic 206, a Wi-Fi configurator 208, and a Wi-Fi transceiver 210.

The scanner 202 scans for the target device 104, which is for example a headless IoT device. The scanner 202 may receive a MAC address for the target device 104 in response to the scan. The scanner 202 sends the MAC address to the vendor action frame logic 206.

The vendor action frame logic 206 receives the MAC address from the scanner 202, obtains Wi-Fi credentials from the credential control memory structure 204, and requests and receives one or more vendor action frame from the target device 104. The vendor action frame logic 206 utilizes the MAC address to determine where to direct the Wi-Fi credentials for authenticating to the Wi-Fi access point 106. The vendor action frame logic 206 generates a vendor action frame to send the Wi-Fi credentials, SSID of the Wi-Fi access point 106, and other instructions to the target device 104. The other instructions may indicate to the target device 104 how to form an application layer that both the client device 102 and the target device 104 may utilize for communicating over the Wi-Fi network, or instructions for how the target device 104 may connect to an application layer already established by the client device 102. This information may be utilized by the target device 104 to configure and authenticate for communication with and over the Wi-Fi network exposed by the Wi-Fi access point 106.

The 802.11 Wi-Fi standard describes action frames and their uses in subsection 8.5. Vendor-specific action frames are defined for vendor-specific signaling. The format of the Action field of the vendor specific action frame is shown in the 802.11 standard. An organization identifier, in the octet field immediately after the category field, differentiates the vendors (see 8.4.1.31).

A vendor action frame comprises the usual MAC header information and action details. It also includes a one byte Category field that identifies the action frame type as "vendor action frame". There is also an Action field that informs the target device 104 of the action to perform—herein, this would identify to the target device 104 to use the information following the Action field, in the Element field (implementation-specific length) to configure and authenticate to the Wi-Fi access point 106.

If the target device 104 successfully connects to the Wi-Fi access point 106, it notifies the client device 102 of the success, or at least it notifies the client device 102 in the event the connection failed (e.g., using another vendor action frame or an application layer).

Either of the target device 104 or the client device 102, or both, may instruct the other to instantiate the application layer by which they communicate.

Figure 3:
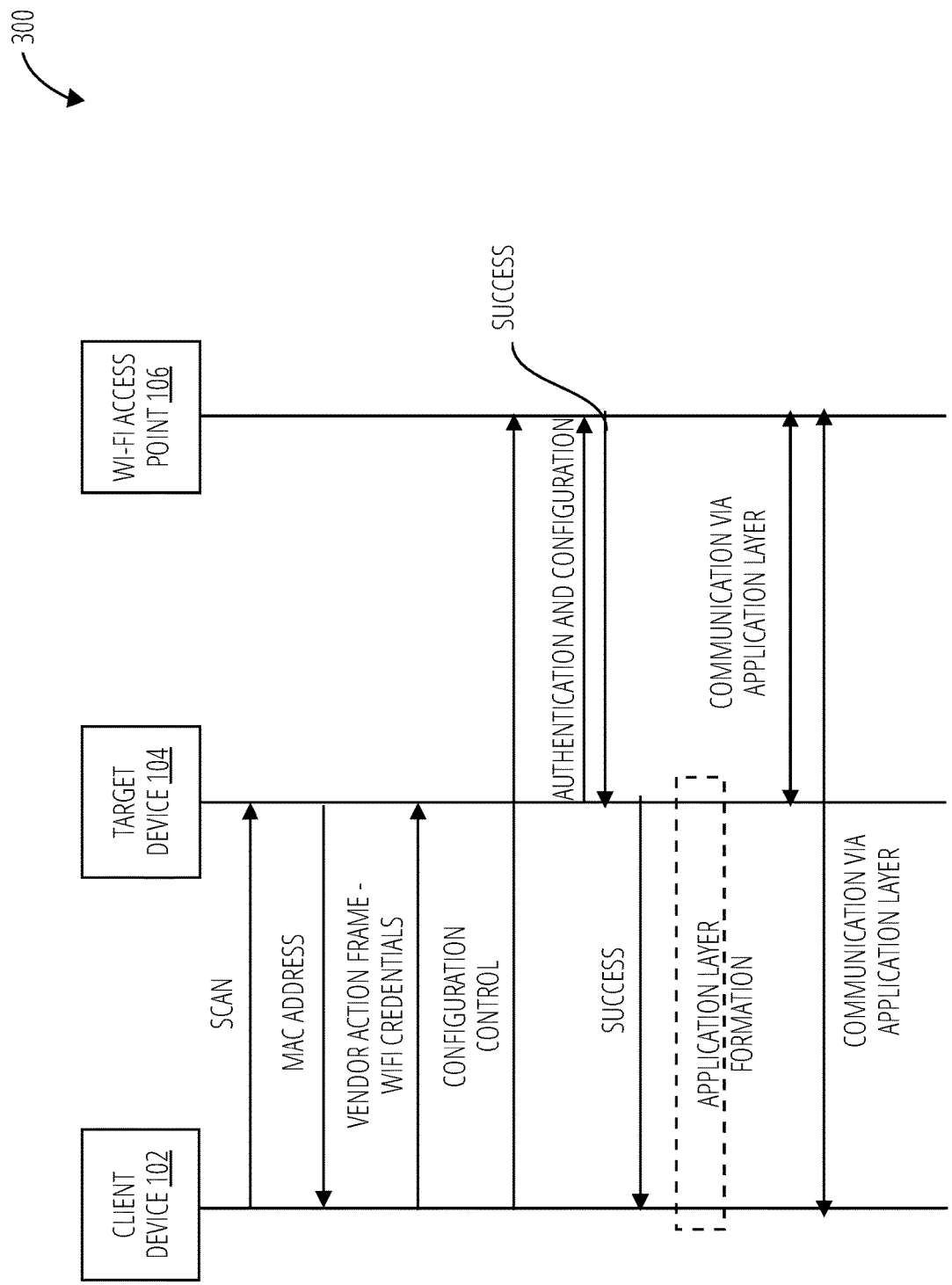
FIG. 3 illustrates an embodiment of a sequence diagram 300.

Referring to FIG. 3, a sequence diagram 300 illustrates the sequence of interactions among a client device 102, a target device 104, and a Wi-Fi access point 106 according to one embodiment. The client device 102 scans for the target device 104. The target device 104 detects the scan and sends the MAC address of the target device 104 to the client device 102 (or the MAC address is picked up by the scan if it is being broadcast). The client device 102 uses the MAC address to send a vendor action frame with the Wi-Fi credentials of the Wi-Fi access point 106 to the target device 104. At this time the target device 104 may form an application layer for communication with the client device 102, or the application layer may be formed later, after the target device 104 joints the Wi-Fi network.

The target device 104 then attempts to authenticate to the Wi-Fi access point 106 using the provided credentials. If the authentication succeeds, the target device 104 reports the success to the client device 102 (or at least, does not report a failure), and the client device 102 and target device 104 communicate over the Wi-Fi network via the application layers.

The target device 104 uses the credentials provided by the client device 102 for authenticating on the Wi-Fi access point 106. The application layer on the target device may be formed in response to a configuration control from the client device 102, or in response to successful authentication to the Wi-Fi access point 106, in response to a subsequent vendor action frame from the client device 102, etc. The client device 102 and the target device 104 then communicate via the application layer using, for example, the Wi-Fi access point 106. If the authentication of the target device 104 fails, or if application layer is not formed for some reason, the target device 104 may send a vendor action frame to the client device 102. The vendor action frame may report failure of the target device 104 to connect to the Wi-Fi access point 106 or to form the application layer for communicating with the client device 102. The client device 102 may respond in a number of ways, for example by repeating the entire process of attempting to connect the target device 104, or just by sending another configuration control to the target device 104.

Figure 4:
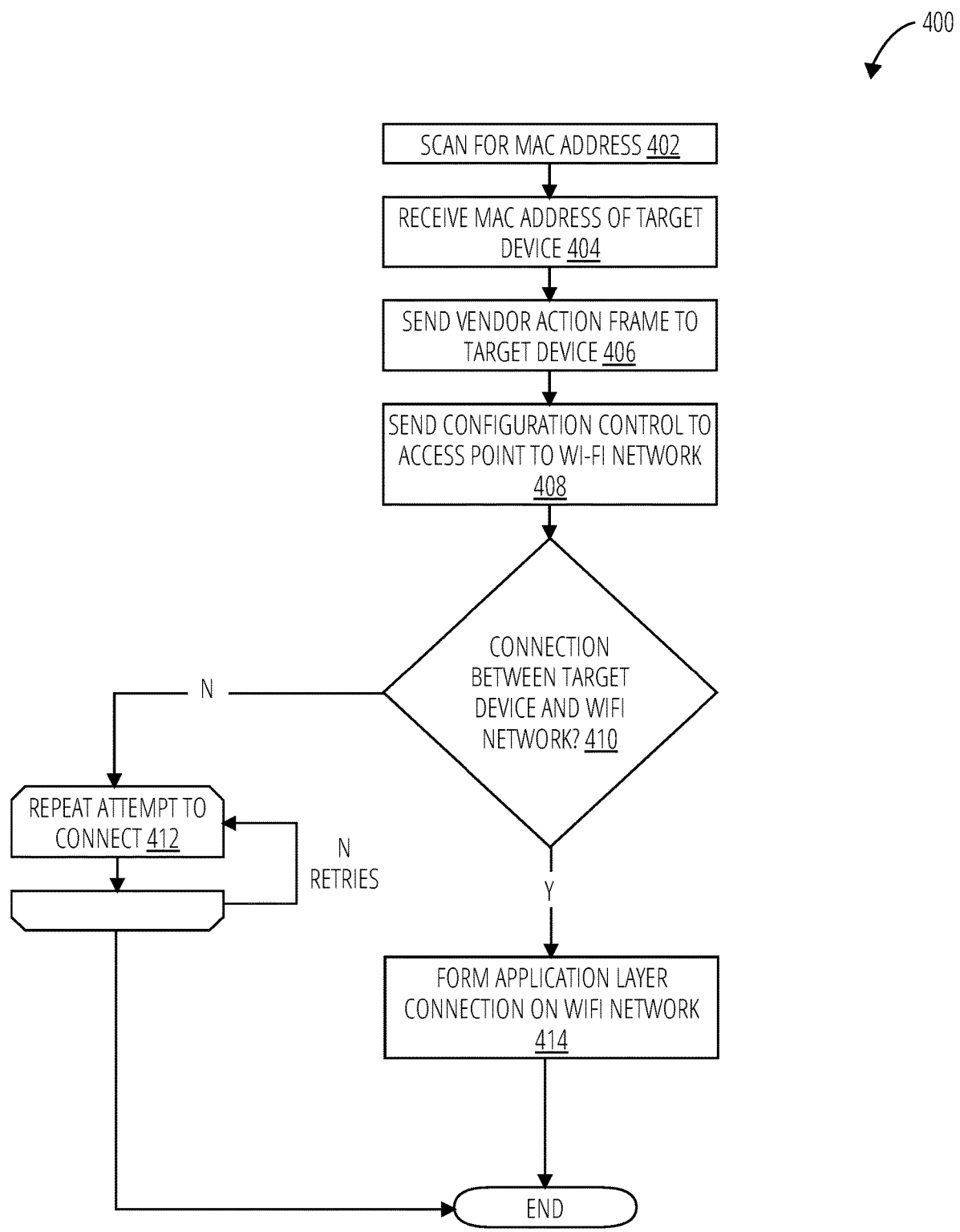
FIG. 4 illustrates an embodiment of a client device process 400.

Referring to FIG. 4, an embodiment of a client device process 400 that executes in the client device 102 scans for a MAC address of a target device (block 402). The MAC address of the target device is then received (block 404). A vendor action frame is then sent to the target device (block 406). The vendor action frame may comprise the credentials for accessing a Wi-Fi network via a Wi-Fi access point. The vendor action frame may also comprise instructions to operate the target device on the Wi-Fi network, such as identifying the application layer that the client device and target device should use to communicate. A configuration control is sent to the Wi-Fi access point (block 408). The configuration control may influence the Wi-Fi access point to authenticate the target device 104 on the Wi-Fi network.

The client device process 400 receives an indication of whether a connection between target device and the Wi-Fi access point has been established or failed (decision block 410). For example, if the connection is not established, a vendor action frame may be received by the client device from the target device. The vendor action may inform the client device of the failed connection. The client device may, in response, repeat the process of attempting to connect the target device 104 to the Wi-Fi access point 106 (repeat loop 412) for a number of retries.

If the connection is established, the application layer is utilized by the target device 104 to communicate over the Wi-Fi network with the client device (block 414).

Figure 5:
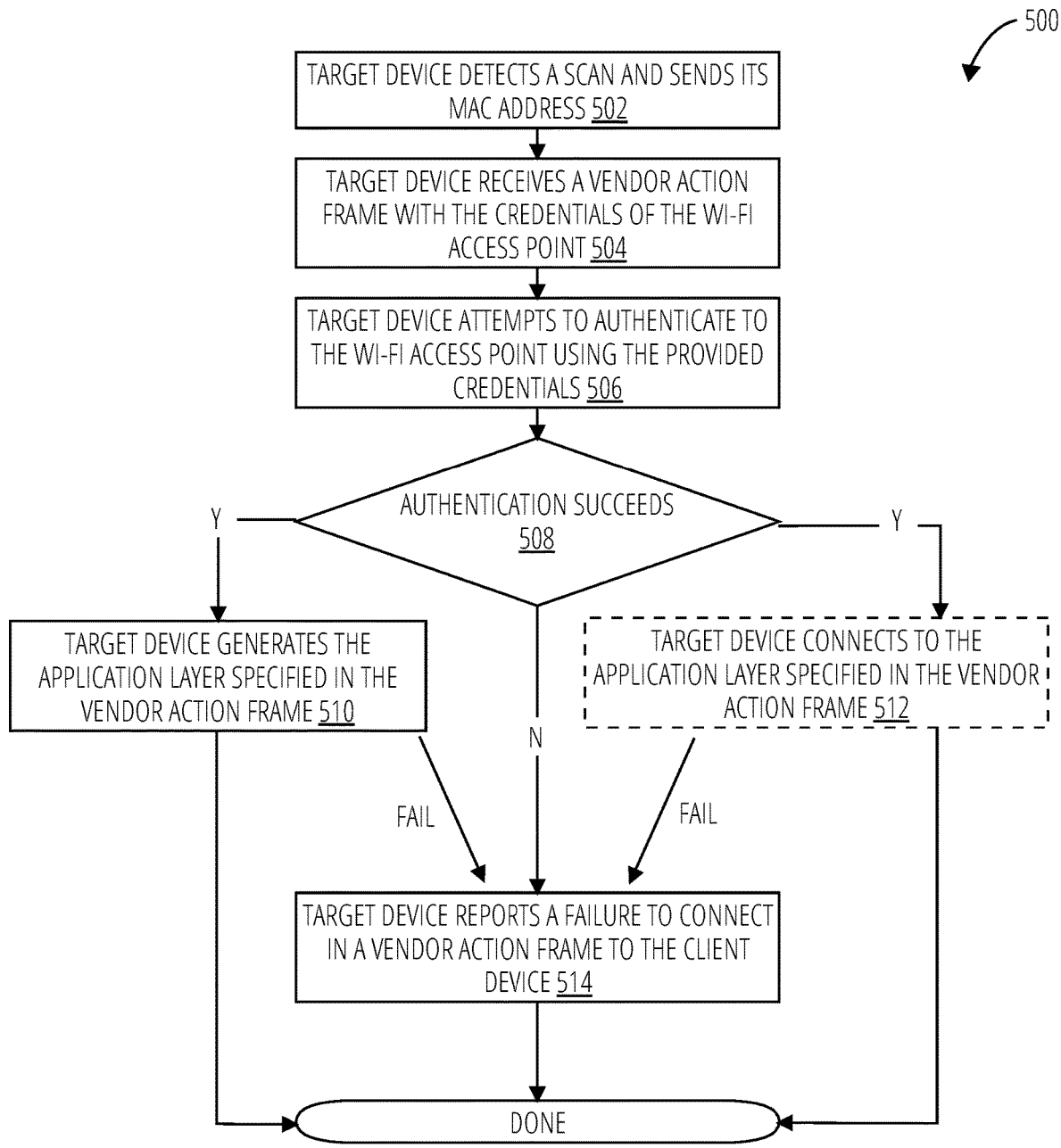
FIG. 5 illustrates a target device process 500 in accordance with one embodiment.

Referring to FIG. 5, a target device process 500 in one embodiment begins when the target device detects a scan and sends its MAC address 502. The target device receives a vendor action frame with the credentials of the Wi-Fi access point 504, and the target device attempts to authenticate to the Wi-Fi access point using the provided credentials 506. If the authentication succeeds 508, the target device cooperates with the client device to communicate over the Wi-Fi network using the application layer specified in the vendor action frame 510, for example, by establishing the application layer and communicating with the client over the Wi-Fi network 512. If the authentication fails (or if there is another failure), the target device reports the failure in a vendor action frame to the client device 514.

Figure 6:
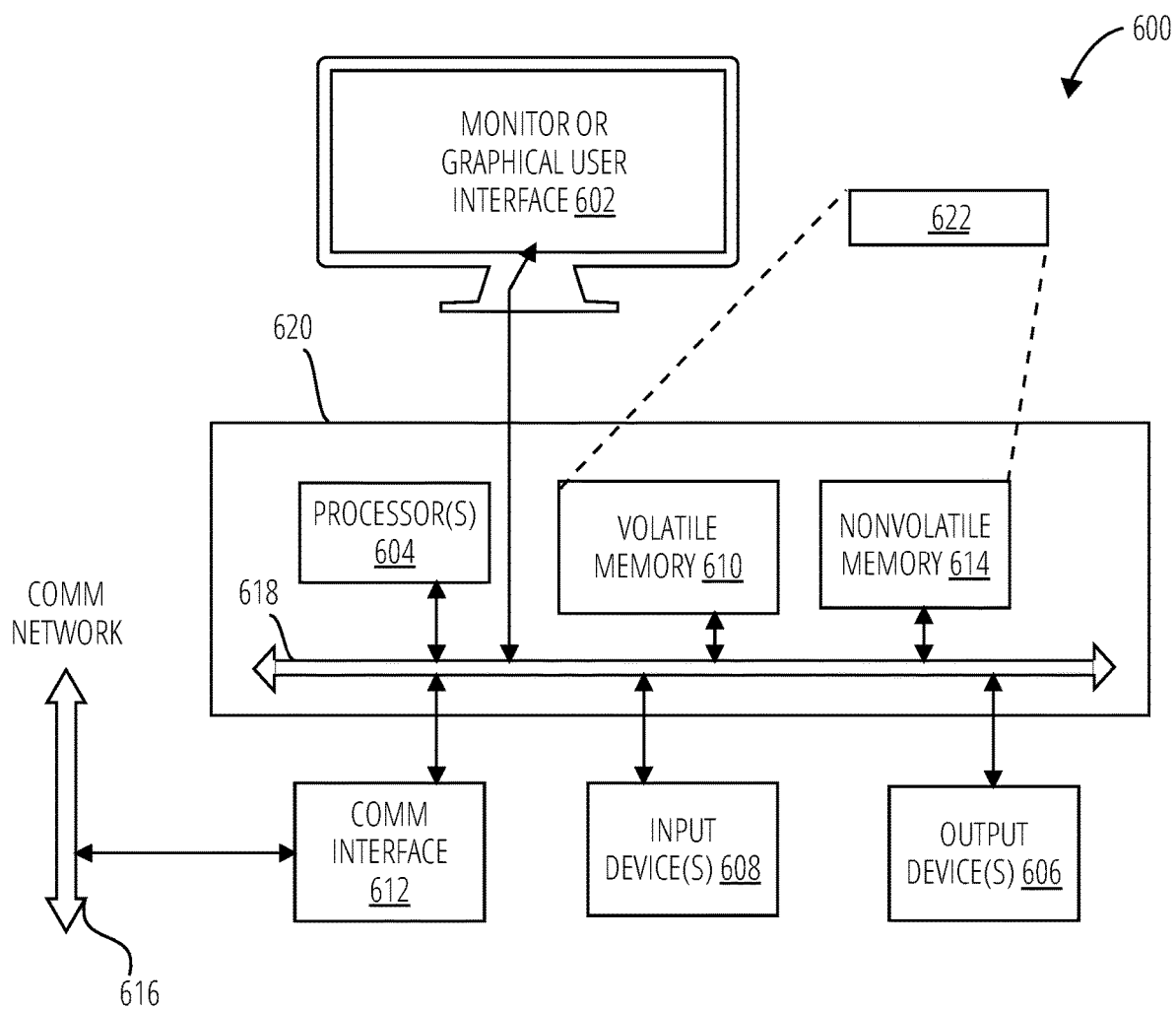
FIG. 6 is an example block diagram of a client device 600 that may incorporate embodiments of the present invention.

FIG. 6 is an example block diagram of a client device 600 that may be utilized for the client device 102. FIG. 6 is merely illustrative of a client device 102 to carry out aspects of the technical processes described herein, and does not limit the scope of the claims. One of ordinary skill in the art would recognize other variations, modifications, and alternatives. In one embodiment, the client device 600 typically includes a monitor or graphical user interface 602, a data processing system 620, a communication network interface 612, input device(s) 608, output device(s) 606, and the like. Some non-limiting examples are smartphones, tablets, game consoles, laptop computers, and desktop computers.

As depicted in FIG. 6, the data processing system 620 may include one or more processor(s) 604 that communicate with a number of peripheral devices via a bus subsystem 618. These peripheral devices may include input device(s) 608, output device(s) 606, communication network interface 612, and a storage subsystem, such as a volatile memory 610 and a nonvolatile memory 614.

The volatile memory 610 and/or the nonvolatile memory 614 may store computer-executable instructions and thus forming logic 622 that when applied to and executed by the processor(s) 604 implement embodiments of the processes disclosed herein.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like.

The output device(s) 606 include devices and mechanisms for outputting information from the data processing system 620. These may include the monitor or graphical user interface 602, speakers, printers, infrared LEDs, and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, ISDN), (asynchronous) digital subscriber line (DSL), FireWire, USB, a wireless communication interface such as BlueTooth or Wi-Fi, a near field communication wireless interface, a cellular interface, and the like.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware, such as "soft modems", or the like.

The client device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present invention.

Logic 622 that implements embodiments of the present invention may be stored in the volatile memory 610 and/or the nonvolatile memory 614. Said logic 622 may be read from the volatile memory 610 and/or nonvolatile memory 614 and executed by the processor(s) 604. The volatile memory 610 and the nonvolatile memory 614 may also provide a repository for storing data used by the logic 622.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files. The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

It will be readily apparent to one of ordinary skill in the art that the client device 600 may be a device such as a smartphone, a desktop computer, a laptop computer, a rack-mounted computer system, a computer server, or a tablet computer device. As commonly known in the art, the client device 600 may be implemented as a collection of multiple networked computing devices. Further, the client device 600 will typically include operating system logic (not illustrated) the types and nature of which are well known in the art.

Figure 7:
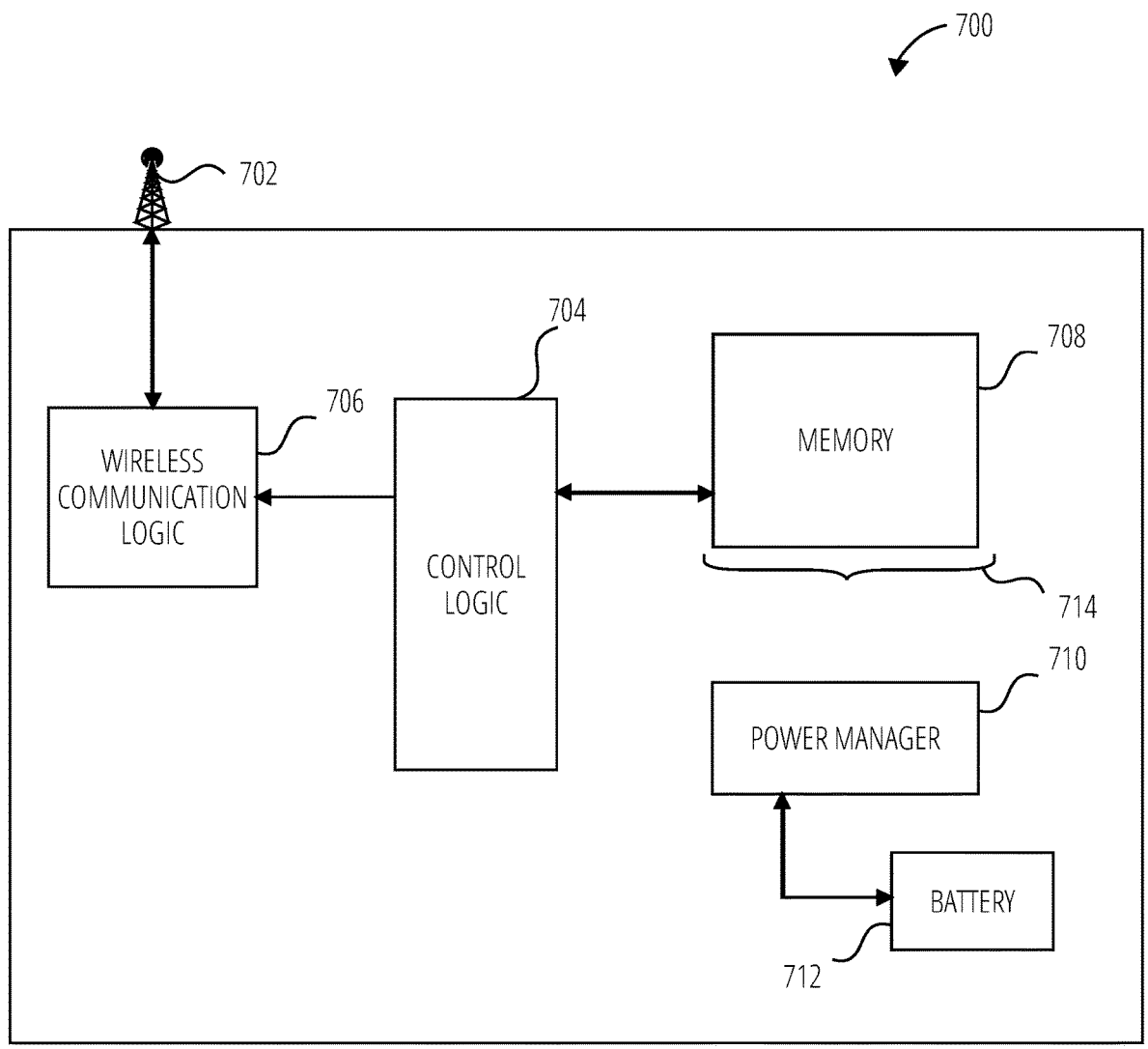
FIG. 7 illustrates an embodiment of a headless IoT device 700.

Referring to FIG. 7, a headless IoT device 700 comprises an antenna 702, control logic 704, wireless communication logic 706, a memory 708, a power manager 710, a battery 712, and logic 714 to implement aspects of the techniques described herein.

The control logic 704 controls and coordinates the operation of other components as well as providing signal processing for the headless IoT device 700. For example control logic 704 may extract baseband signals from radio frequency signals received from the wireless communication logic 706 logic, and processes baseband signals up to radio frequency signals for communications transmitted to the wireless communication logic 706 logic. Control logic 704 may comprise a central processing unit, digital signal processor, and/or one or more controllers or combinations of these components.

The wireless communication logic 706 may further comprise memory 708 which may be utilized by the control logic 704 to read and write instructions (commands) and data (operands for the instructions). The memory 708 may comprise logic 714 to carry out aspects of the processes disclosed herein, e.g., those aspects executed by a headless IoT device.

The headless IoT device 700 may operate on power received from a battery 712. The battery 712 capability and energy supply may be managed by a power manager 710.

The headless IoT device 700 may transmit wireless signals of various types and range (e.g., cellular, GPS, Wi-Fi, BlueTooth, and near field communication i.e. NFC). The headless IoT device 700 may also receive these types of wireless signals. Wireless signals are transmitted and received using wireless communication logic 706 logic coupled to one or more antenna 702. Other forms of electromagnetic radiation may be used to interact with proximate devices, such as infrared (not illustrated).

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method comprising:
    connecting a client device to a first Wi-Fi network access point;
    receiving on the client device a MAC address from a target device in an 802.11 beacon;
    without generating a second Wi-Fi network access point on the target device, communicating from the client device to the target device via 802.11 signaling a first vendor action frame to influence the target device to authenticate to the first Wi-Fi network, the first vendor action frame comprising authentication credentials for the first Wi-Fi network and instructions to instantiate target device application logic compatible for communication with application logic of the client device over the first Wi-Fi network.

2. The method of claim 1, wherein the first vendor action frame is configured to cause to target device to instantiate the target device application logic in response to successfully authenticating on the first Wi-Fi network.

3. The method of claim 1, wherein the application logic of the client device is instantiated on the client device prior to the target device authenticating to the first Wi-Fi network, and the instructions further comprise instructions for the target device to connect to the application logic of the client device.

4. The method of claim 1, further comprising:
    the client device receiving from the target device a second vendor action frame indicating a failure of one or more of (a) the target device authenticating to the first Wi-Fi network, or (b) the target device failing to instantiate the target device application logic.

5. The method of claim 1, further comprising:
the client device communicating with the target device over the first Wi-Fi network via the target device application logic, once the target device is authenticated on the first Wi-Fi network.

6. A method on a device, the method comprising:
wirelessly broadcasting a MAC address in an 802.11 beacon;
without establishing a Wi-Fi access point on the device, receiving an 802.11 vendor action frame comprising access credentials for authenticating to an external Wi-Fi access point;
applying the credentials to authenticate to the external Wi-Fi access point;
instantiating logic specified in the vendor action frame for communicating over the external Wi-Fi access point; and
communicating through the external Wi-Fi access point via the instantiated logic.

7. The method of claim 6, further comprising:
the vendor action frame comprising an identification of pre-instantiated application logic of a device that provided the vendor action frame.

8. The method of claim 6, further comprising:
generating a response vendor action frame to the vendor action frame in response to one or both of (a) failure to authenticate to the external Wi-Fi access point, or (b) failure to instantiate the logic specified in the vendor action frame.

9. The method of claim 6, executed by a headless IoT-enabled device.

10. A non-transitory computer-readable storage medium, the computer-readable storage medium including instructions that when executed by a processor, cause a device comprising the medium to:
wirelessly communicate a MAC address;
without instantiating a Wi-Fi access point on the device, receive an 802.11 vendor action frame directed to the MAC address, the vendor action frame comprising credentials for authenticating to an external Wi-Fi access point;
apply the credentials to authenticate to the external Wi-Fi access point;
instantiate application logic specified in the vendor action frame; and
operate the instantiated application logic to communicate over the external Wi-Fi access point with application logic of a source device of the vendor action frame.

11. The computer-readable storage medium of claim 10, wherein the instructions further identify pre-instantiated application logic on the source device and instruct the device to connect to the pre-instantiated application logic.

12. The computer-readable storage medium of claim 10, wherein the instructions further configure the device to:
generate a response vendor action frame to the source device when or more one of (a) authentication to the external Wi-Fi access point fails, or (b) instantiation of the logic specified in the vendor action frame fails.

13. The computer-readable storage medium of claim 10, comprised by a headless IoT enabled device.

* * * * *